UNITED STATES PATENT OFFICE.

NICOLAI WASILIEVITCH TURKIN, OF MOSCOW, RUSSIA.

FAST LIGHT-PROOF COLORING MATTERS OR DYES AND PROCESS OF MAKING SAME.

1,173,330.  Specification of Letters Patent.  Patented Feb. 29, 1916.

No Drawing.  Application filed January 9, 1914.  Serial No. 811,173.

*To all whom it may concern:*

Be it known that I, NICOLAI WASILIEVITCH TURKIN, a subject of the Czar of Russia, residing at Moscow, Russia, have invented certain new and useful Improvements in Fast Light-Proof Coloring Matters or Dyes and Processes of Making Same, of which the following is a specification.

This invention relates to improvements in the manufacture of fast light-proof dyes or coloring matters.

In the utilization of dyes or colors for any desired purpose, whether painting, dyeing of fabrics or printing, it is essential that the colors should resist the action of light and be unaffected by treatment with water, soap and like materials, such as are used for cleaning the fabrics, and also that it should be possible to prevent them from becoming mixed together or diffusing into one another, either at the same time as, or after, they are put on. The latter is of special importance when the colors are to be put on side by side, as for example in a printing process.

According to this invention a process for the manufacture of fast coloring matters of a light resisting nature consists in forming a colloidal solution of the coloring matter in a mass having a base of alizarin (Turkey red) oil and insoluble in water, the mixture of coloring matter and material with which it is to be incorporated being heated until the whole solidifies on cooling. This mass in which the pigment is dissolved sets to a homogeneous translucent or transparent amorphous substance and serves as a color carrier or vehicle which enables the pigment to spread over the surfaces to be painted. Moreover the color vehicle protects the pigment owing to this latter being embedded or dissolved therein; for the same reason coloring matters manufactured in this manner are especially suitable for color printing, as the surface from which the impression is to be taken is simply coated with a layer of the coloring matter, and on moistening this with a solvent for the color carrier, the latter, together with the pigment dissolved therein, is removed in a larger or smaller quantity according to the amount of solvent employed. The mixture of a color pigment in alizarin oil may be used for some purposes, without other ingredients, but I prefer to add thereto other carrier-forming and filling materials, as hereinafter described.

A further feature of this invention consists in incorporating with the color pigment and alizarin oil, either salts of metals of the alkali earths or alkalis or basic aluminium acetate, or mixtures of these substances. Naphthalene and also certain fats and oils containing substances like trimethylamin, cholesterin or triglycerids can also be incorporated with the mixture in which the coloring matter is dissolved according to the particular use for which the composition ultimately obtained is intended.

In carrying out this invention, as carriers for the pigment there have proved particularly advantageous substances obtained by heating together alizarin (Turkey red) oil and salts of metals of the alkali earths or alkalis with or without basic aluminium acetate. Particularly good results are obtained with carriers produced by heating mixtures which contain in addition to alizarin (Turkey red) oil, basic aluminium acetate. Most salts of metals of the alkali earths however, and some alkali metal salts, are also suitable for the purpose.

Throughout this specification and claims the term "metallic salts" does not include salts other than basic aluminium acetate and salts of the alkali and alkali earth metals, and the term alizarin (Turkey red) oil is used to denote neutralized products obtained by treating with sulfuric acid not only olive oil, but also other oils, such for example as castor oil, cotton seed oil and other oils containing glycerids of palmitic acid, oleic acid, etc. By incorporation of pigments in such carriers in which they are completely dissolved, there are produced dye-stuffs or colors possessing a much greater resistance to light than that which the same pigment would have if it were not incorporated in this way in the carrier mentioned above. In addition to the substances already mentioned as used for forming the pigment carriers, namely alizarin (Turkey red) oil and salts of metals of the alkali earths or alkalis, there may be added to the mass other substances, partly for the purpose of increasing the resistance of the color to light, and partly as more or less indifferent substances chiefly intended for insuring better distribution of the pigment in the mass of its carrier. The substances of the first mentioned kind include naphthalene and its derivatives. It has been found that when a mixture containing alizarin (Turkey red) oil and a salt of an alkali earth metal is heated in the presence of naphthalene, the resistance to light of the color obtained with the use of such carrier is rendered still greater than the resistance which the color in question possessed when naphthalene was not employed. More especially is this the case when the carrier contains basic aluminium acetate. The same effect as naphthalene is produced by the majority of its derivatives, and throughout this specification and claims the word naphthalene is used to denote both naphthalene or its derivatives. Further, an addition of oils and such animal fats which contain tri-methylamin, cholesterin or tri-glycerids, such as tri-butyrin, tri-olein, and tri-palmitin, has also proved of great assistance in improving the resistance to light of the coloring matters, and throughout this specification and claims substances such as the oils and fats mentioned above will be denoted by the term "animal fatty substances."

The favorable action of the animal fatty substances employed, such as fish oil, wool fat and vegetable resins containing the previously mentioned compounds, is probably due to the fact that they combine with any excess of alkali or alkali earth salts present in the color lake.

In order to enable the colors, that is the substance produced by incorporating the dye stuff or pigment in a carrier to absorb naphthalene uniformly, it is practically necessary that the naphthalene be added thereto while the mass is hot and in the presence of animal fatty substances, such as fish oil or wool fat and vegetable resins, as for instance copal resin.

In order to dilute the coloring matters obtained in the manner described to the degree required for their practicable application it is advisable to use as diluents varnishes of a special nature, namely, those produced by heating together resin and fish oil and dissolving the product in naphtha or in liquids obtained by the distillation of resin, coal or naphtha, such for example as turpentine oil, toluol, benzol and creosote.

The following are examples of preferred methods of carrying the invention into effect:

*Example I—Manufacture of colors for ordinary painting purposes.*—There are first of all prepared three mixtures consisting of—1. 100 gms. basic aluminium acetate and 600 gms. alizarin (Turkey red) oil. 2. 10 gms. Biebrich scarlet of the class of azo dyes and 100 gms. alizarin (Turkey red) oil. 3. 30 gms. naphthalene and 70 gms. fish (train) oil. These three mixtures are combined together, and into the same are introduced 40 gms. talc, 30 gms. powdered clay and 30 gms. pulverized barium sulfate, and the whole mass is heated with constant stirring, in a sand or steam bath, to about 165° C. until the mass solidifies on cooling. When the mixtures mentioned under headings 1-3 in this example are heated without the addition of powder-like earths, an end product is obtained which, in thin layers, is as transparent as glass and is colored in a perfectly uniform manner. A suitable diluent or varnish for the coloring substance is obtained by stirring and boiling together 2.5 kg. fish (train) oil with about 9 kg. shellac or, as is preferred, with 7.5 kg. powdered copal resin (Angola) and a small quantity, for instance 1 kg. turpentine oil, the mass being thereupon poured while still warm into about 30 kg. toluol or 10 kg. turpentine oil and thoroughly stirred, until a clear solution is produced. Into this varnish is introduced a suitable quantity of the coloring matter obtained in the above described manner, until the desired degree of spreading and covering capacity is obtained.

*Example II—Colors for artistic painting.*—For artistic painting there can be used the same coloring matter as that just described, but preferably with a slightly different varnish. This varnish differs from the varnish described for colors intended for ordinary painting, only by the fact that the solid resins are partly replaced by easily liquefied resins in the shape of balsams, such as for example copaiba balsam, in such manner that for 2.5 kg. fish (train) oil there are used 5 kg. copal resin and 2.5 kg. copaiba balsam. These three ingredients are again boiled together, whereupon the mass is again dissolved in a suitable quantity of toluol or some other product of distillation of naphtha, coal or resin.

*Example III—Colors for printing purposes.*—First of all there are prepared three mixtures, as before consisting of:—1. 100 gms. basic aluminium acetate and 200 gms. alizarin (Turkey red) oil. 2. 10 gms. Biebrich scarlet and 100 gms. alizarin (Turkey red) oil. 3. 20 gms. naphthalene and 20 gms. fish (train) oil. These three mixtures are combined together, and a mixture of resins, consisting of 50 gms. Canada balsam, 250 gms. Venetian turpentine, 100 gms. copal resin, 50 gms. pine resin, 25 gms. elemi resin, 50 gms. shellac, is added to it, with constant stirring and heating. Moreover, 25 gms. glucose, previously mixed if desired with powdered resins, are added to the mass. The mass is again boiled, until it becomes solid on cooling. With this coloring mass is combined a thick fluid resin mixture previously prepared by mixing 125 gms. fish (train) oil, 650 gms. copal resin with 225 gms. spirits of wine (95%) or some other (preliminary) solvent, and boiling the mixture in question. In the event of the mass being too solid for treatment, some solvent, such as for instance toluol, can be added to it, until it acquires the desired consistency.

The above mentioned proportions of the substances employed for the production of coloring matters may vary within wide limits, and must be altered to suit the nature of the coloring matter or dye stuff used, and of the salts and other admixtures (naphthalene or animal fatty substances) to be combined with the alizarin (Turkey red) oil in the production of the pigment carrier. It is to be understood therefore that the proportions for the mixture mentioned in this specification are only given by way of example, and that these can be varied according to the particular coloring matter that is to be produced without departing from the spirit and scope of the invention. I also desire it to be understood that the appended claims are to be read with the aforegoing statements in view.

The process can be applied to any available pigments, in so far as they are soluble, or can be distributed colloidally (not in the form of grains), in a carrier substance produced from alizarin (Turkey red) oil and basic aluminium acetate, and/or a salt of an alkali earth or alkali metal, the pigments, if desired, being previously dissolved in a small quantity of a solvent other than alizarin oil for the purpose of facilitating their introduction into the carrier substance. As suitable pigments there can be employed all coal-tar dyes as for example nitro compounds, azo dyes, oxy-quinones, xanthones, quinone-oxims, derivatives of triphenyl-carbinol, quinone-imids, quiolins, acridins, phthaleins, azin compounds, ketone-imids, hydrazones, indulins, indigo, etc., and pigments derived from animal, vegetable and mineral sources also.

What I claim as my invention and desire to secure by Letters Patent is:—

1. The herein described method of manufacturing fast light-proof coloring matters, which consists in heating a color pigment with a mixture of alizarin oil and a metallic salt, said mixture being insoluble in water, to form a colloidal solution which will solidify on cooling.

2. The herein described method of manufacturing fast light-proof coloring matters, which consists in heating a color pigment with a mixture of alizarin oil and metallic salts, said mixture being insoluble in water, to form a colloidal solution which will solidify on cooling.

3. The herein described method of manufacturing fast light-proof coloring matters, which consists in heating a color pigment with a mixture of alizarin oil and salts of metals of the alkali earths, said mixture being insoluble in water, to form a colloidal solution which will solidify on cooling.

4. The herein described method of manufacturing fast light-proof coloring matters, which consists in heating a color pigment with a mixture of alizarin oil, basic aluminum acetate, and salts of metals of the alkali earths, and also a filling material, to form a colloidal solution which will solidify on cooling.

5. The herein described method of manufacturing fast light-proof coloring matters, which consists in heating a color pigment with a mixture of alizarin oil and metallic salts, and also a filling material, to form a colloidal solution which will solidify on cooling.

6. The herein described method of manufacturing fast light-proof coloring matters, which consists in heating a color pigment with a mixture of alizarin oil, naphthalene, animal fatty substances, and metallic salts, to form a colloidal solution which will solidify in mass on cooling.

7. The herein described method of manufacturing fast light-proof coloring matters, which consists in heating a color pigment with a mixture of alizarin oil, naphthalene and metallic salts to form a colloidal solution which will solidify in mass on cooling.

8. The herein described method of manufacturing fast light-proof coloring matters, which consists in heating a color pigment with a mixture of alizarin oil, naphthalene, animal fatty substances and metallic salts, and also a filling material, to form a colloidal solution which will solidify in mass on cooling.

9. The herein described method of manufacturing fast light-proof coloring matters, which consists in heating a color pigment with a mixture of alizarin oil, naphthalene and metallic salts, and also a filling material, to form a colloidal solution which will solidify in mass on cooling.

10. The herein described method of manufacturing fast light-proof coloring matters, which consists in forming a colloidal solution of a color pigment by heating together a pigment material, a mixture of alizarin oil and a salt of a metal of the alkali earths, and animal fatty substances and naphthalene.

11. The herein described method of manufacturing fast light-proof coloring matters, which consists in forming a colloidal solution of a color pigment by heating together a color pigment mixed with alizarin oil, a mixture of alizarin oil, basic aluminum acetate and a salt of a metal of the alkali earths, and a mixture of animal fatty substances and naphthalene.

12. The herein described method of manufacturing fast light-proof coloring matters, which consists in forming a colloidal solution of a color pigment by heating together a color pigment mixed with alizarin oil, a mixture of alizarin oil, basic aluminum acetate and a salt of a metal of the alkali earths, and a mixture of animal fatty substances, naphthalene, and also a filling material.

13. The herein described method of manufacturing fast light-proof coloring matters, which consists in forming a colloidal solution of a color pigment by heating a mixture of a color pigment and alizarin oil, a mixture of alizarin oil and metallic salts, and a mixture of animal fatty substances and naphthalene, the aforesaid mixtures being heated together until the whole mass solidifies on cooling.

14. The herein described method of manufacturing fast light-proof coloring matters, which consists in forming a colloidal solution of a color pigment by heating a mixture of a color pigment and alizarin oil, a mixture of alizarin oil and metallic salts, and a mixture of animal fatty substances and naphthalene.

15. The herein described method of manufacturing fast light-proof coloring matters, which consists in heating together a mixture containing a color pigment, metallic salts, substances to increase the light-resisting power of the coloring matter, and indifferent substances which will improve the distribution of the pigment in the carrier, and thereby forming a colloidal solution of the pigment which will solidify on cooling.

16. The herein described composition of matter, comprising a carrier having a color pigment colloidally distributed therein, and formed by heating together a mixture which comprises alizarin oil, a color pigment and a substance for rendering the mixture insoluble in water, in substantially the proportions specified, until the mixture will solidify on cooling; substantially as described.

17. The herein described composition of matter, comprising an insoluble carrier having a color pigment colloidally distributed therein, and formed by heating together a mixture containing alizarin oil, a metallic salt, and a color pigment, in substantially the proportions specified, until the mixture solidifies on cooling.

18. The herein described composition of matter, comprising an insoluble carrier having a color pigment colloidally distributed therein, and formed by heating together a mixture containing alizarin oil, basic aluminum acetate, and a color pigment, in substantially the proportions specified, until the mixture solidifies on cooling.

19. The herein described composition of matter, comprising a colloidal solution of a color pigment formed by heating a mixture containing the color pigment with alizarin oil, naphthalene and a metallic salt, in substantially the proportions specified.

20. The herein described composition of matter, comprising a colloidal solution of a color pigment formed by heating a mixture containing the color pigment with alizarin oil, naphthalene, animal fatty substances and a metallic salt, in substantially the proportions specified.

21. The herein described composition of matter, comprising a colloidal solution of a color pigment formed by heating a mixture containing the color pigment with alizarin oil, naphthalene and basic aluminum acetate, in substantially the proportions specified.

22. The herein described composition of matter, comprising a colloidal solution of a color pigment formed by heating a mixture containing the color pigment with alizarin oil, naphthalene, basic aluminum acetate and salts of metals of the alkali earths, in substantially the proportions specified.

23. The herein described composition of matter which comprises a colloidal solution of a color pigment, and which is formed by heating together the following, viz: (1) a mixture containing alizarin oil and a color pigment; (2) a mixture containing naphthalene and an animal fatty substance; (3) a metallic salt; (4) and a filling mixture containing talc, powdered clay and barium sulfate; substantially as described.

24. The herein described composition of matter which comprises a colloidal solution of a color pigment, and which is formed by heating together the following, viz: (1) a mixture containing alizarin oil and a color pigment; (2) naphthalene; (3) basic aluminum acetate and salts of metals of the alkali earths; and (4) a filling mixture containing talc, powdered clay and barium sulfate; substantially as described.

In testimony whereof I have signed my name to this specification in the presence of two subscribing witnesses.

NICOLAI WASILIEVITCH TURKIN.

Witnesses:
CHRISTIAN ERFURT,
LYDIA RÖLL.